United States Patent
Seaman

(10) Patent No.: US 6,680,917 B1
(45) Date of Patent: Jan. 20, 2004

(54) SPANNING TREE WITH RAPID PROPAGATION OF TOPOLOGY CHANGES

(75) Inventor: Michael John Seaman, Mountain View, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 10/352,717

(22) Filed: Jan. 28, 2003

Related U.S. Application Data

(63) Continuation of application No. 09/232,724, filed on Jan. 15, 1999, now Pat. No. 6,611,502.

(51) Int. Cl.[7] .................................................. H04L 12/28
(52) U.S. Cl. ...................................... 370/256; 370/401
(58) Field of Search ................................ 370/256, 254, 370/401, 408, 255, 428; 709/239, 242

(56) References Cited

U.S. PATENT DOCUMENTS

| | | | |
|---|---|---|---|
| 5,734,824 A | 3/1998 | Choi | |
| 5,790,808 A | 8/1998 | Seaman | |
| 6,032,194 A | 2/2000 | Gai et al. | |
| 6,044,087 A | 3/2000 | Muller et al. | |
| 6,044,418 A | 3/2000 | Muller | |
| 6,049,528 A | 4/2000 | Hendel et al. | |
| 6,052,737 A | 4/2000 | Bitton et al. | |
| 6,052,738 A | 4/2000 | Muller et al. | |
| 6,061,362 A | 5/2000 | Muller et al. | |
| 6,081,512 A | 6/2000 | Muller et al. | |
| 6,081,522 A | 6/2000 | Hendel et al. | |
| 6,088,356 A | 7/2000 | Hendel et al. | |
| 6,094,435 A | 7/2000 | Hoffman et al. | |
| 6,119,196 A | 9/2000 | Muller et al. | |
| 6,128,666 A | 10/2000 | Muller et al. | |
| 6,188,694 B1 | 2/2001 | Fine et al. | |
| 6,202,114 B1 | 3/2001 | Dutt et al. | |
| 6,246,669 B1 | 6/2001 | Chevalier et al. | |
| 6,246,680 B1 | 6/2001 | Muller et al. | |
| 6,262,977 B1 | 7/2001 | Seaman et al. | |
| 6,298,456 B1 | 10/2001 | O'Neil et al. | |
| 6,330,229 B1 | 12/2001 | Jain et al. | |
| 6,388,995 B1 | 5/2002 | Gai et al. | |

*Primary Examiner*—Kenneth Vanderpuye
(74) *Attorney, Agent, or Firm*—Mark A. Haynes; Haynes Beffel Wolfeld LLP

(57) ABSTRACT

Modifications to the spanning tree algorithm allow bad news to propagate quickly by providing that protocol entities on bridges process inferior information sent by the designated bridge for each LAN. In addition, bridges use per port hello timers to stimulate information propagation, setting it to suit local link characteristics. No changes to the format of bridge protocol data units (BPDUs) as specified in the IEEE Standard 802.1D are required, and the algorithm for computing the topology of the network remains unchanged. Techniques have been adopted for expiring information and recomputing the spanning tree upon detection of link failure, upon receipt of a message having a message age greater than its accompanying maximum age, or if the port hello time algorithm detects a loss of link. Rules for propagating information are provided allowing rapid propagation of changes. Finally, techniques for burning out information in a configuration message are adopted.

18 Claims, 10 Drawing Sheets

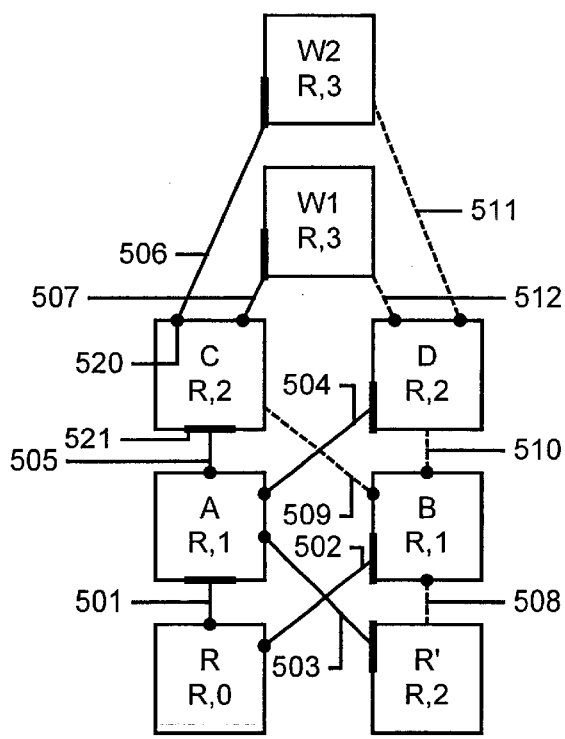
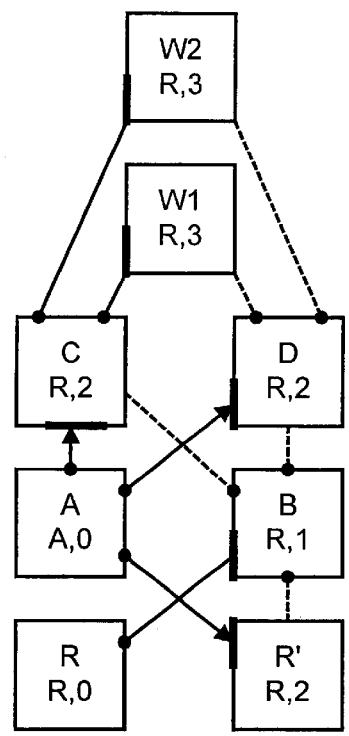
FIG.5A  FIG.5B
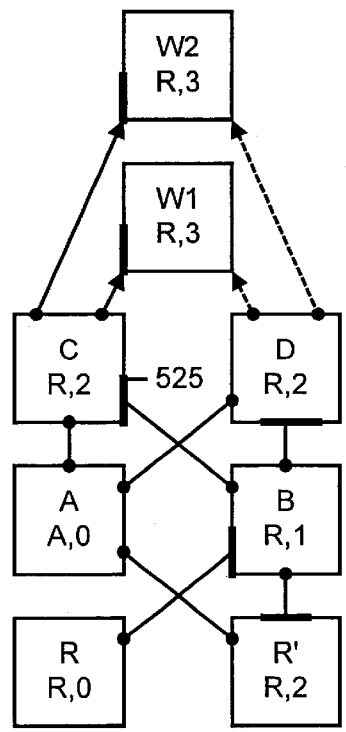
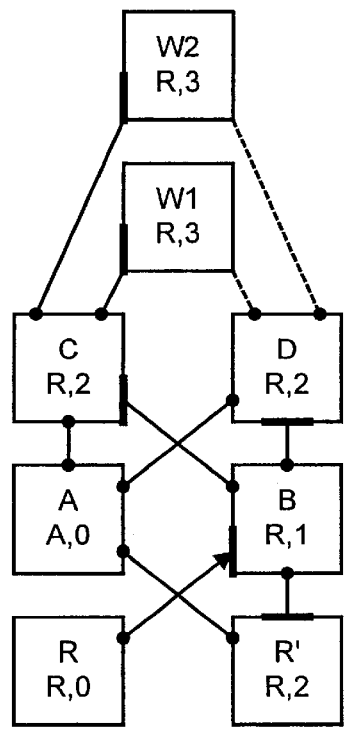
FIG.5C  FIG.5D

Fig. 7A — Port Roles and States, with enhanced transitions for point-to-point networks only

| Port Role | Disabled Port | Root Port | | Designated Port | | | Alternate Port | |
|---|---|---|---|---|---|---|---|---|
| Port State | Disabled | Forwarding | Listening | Listening | Learning | Forwarding | Blocking | |
| forwarding? | No | Yes | No | No | No | Yes | No | |
| learning? | No | Yes | No | No | Yes | Yes | No | |
| Events | | | | Transitions | | | | |
| become disabled | X | Disabled | Disabled | Disabled | Disabled | Disabled | Disabled | |
| become root port | X | X | Root Port Forwarding | Root Port Forwarding | Root Port Forwarding | Root Port Forwarding | Root Port Forwarding | |
| become designated1[10] | Designated Listening[a] | Designated Listening[a] | X | X | X | X | Designated Listening | |
| become designated2[11] | Designated Listening[a] | Designated Forwarding | X | X | X | X | Designated Listening | |
| become alternate[12] | X | Alternate Blocking | Alternate Blocking[d] | Alternate Blocking[d] | Alternate Blocking[d] | Alternate Blocking | X | |
| forward delay timer expiry | X | X | Designated Learning[a] | Designated Learning[a] | Designated Forwarding | X | X | |

FIG. 7A

Fig. 7B — Port States, with enhanced transitions for point-to-point networks only

| Port State | Disabled | Listening | Learning | Forwarding | Blocking |
|---|---|---|---|---|---|
| forwarding? | No | No | No | Yes | No |
| learning? | No | No | Yes | Yes | No |
| Events | | | Transitions | | |
| become disabled | X | Disabled | Disabled | Disabled | Disabled |
| become root port | X | Forwarding | Forwarding | — | Forwarding |
| become designated1 | Listening[a] | — | — | — | Listening[a] |
| become designated2 | Listening[a] | — | — | — | Listening[a] |
| become alternate | X | Blocking[d] | Blocking[d] | Blocking | X |
| forward delay timer expiry | X | Learning[a] | Forwarding | X | X |

FIG. 7B

SPANNING TREE WITH RAPID PROPAGATION OF TOPOLOGY CHANGES

CROSS REFERENCE TO RELATED APPLICATIONS

This application is a continuation of application Ser. No. 09/232,742 filed Jan. 15, 1999 now U.S. Pat. No. 6,611,502, which is related to U.S. patent application Ser. No. 09/141, 803 entitled High Availability Spanning Tree With Rapid Reconfiguration, filed Aug. 28, 1998 now U.S. Pat. No. 6,262,977, invented by Michael Seaman and Vipin Jain, and to U.S. patent application Ser. No. 09/188,852 entitled Spanning Tree With Rapid Forwarding Database Updates, filed Nov. 9, 1998 now U.S. Pat. No. 6,330,229, invented by Vipin Jain and Michael Seaman; and such applications are incorporated by reference as if fully set forth herein.

BACKGROUND OF THE INVENTION

1. Field of the Invention

The present invention relates to network protocols and network intermediate devices executing such protocols; and more particularly to algorithms for managing a tree of network devices for a data network according to a spanning tree protocol.

2. Description of Related Art

Local area networks LANs specified according to IEEE Standards for Local and Metropolitan Area Networks under section 802.x, of all types may be connected together with media access control MAC bridges. Bridges interconnect LAN segments so that stations connected to the LANs operate for many purposes as if they were attached to a single LAN. The MAC bridge according to the IEEE standards is specified for operating below the MAC service boundary, and is transparent to protocols operating above this boundary, including protocols operating in the logical link control sublayer or the network layer. Thus, a bridged local area network provides for interconnection of stations attached to LAN segments of different MAC types, for increases in the physical extent, the number of permissible attachments and the total performance of a LAN, and for the partitioning of a physical LAN support for administrative or maintenance reasons. The MAC bridge is specified according to the IEEE Standard 802.1D (IEEE Std 802.1D-1990, IEEE Standards for Local and Metropolitan Area Networks: Media Access Control (MAC) Bridges.) The 802.1D specification is incorporated by reference as if fully set forth herein.

When a bridged network is established, it is possible to create loops in the network caused by providing more than one path through bridges in LAN segments between two points. Thus, according to the 802.1D standard, an active topology for the bridge network is maintained according to the spanning tree protocol which is described in the standard. The spanning tree protocol automatically establishes fully connected (spanning) and loop-free (tree) bridged network topology. It uses a distributed algorithm that selects a root bridge and the shortest path to that root from each LAN. Tie breakers are used to ensure that there is a unique shortest path to the root, while uniqueness of the root is guaranteed by using one of its MAC addresses as part of a priority identifier.

Every LAN in the network has one and only one "designated port" providing that LAN's shortest path to the root, through the bridge of which the designated port is a part. The bridge is known as the designated bridge for that LAN. Bridges other than the root bridge at the root of the network can be termed branch bridges. Every branch bridge has a "root port" which is the port providing that bridge's shortest path to the root, across a LAN and through the designated port on a designated bridge. Ports other than the root port are designated ports, or alternate ports according to the standard. An alternate port is connected to a LAN for which another bridge is the designated bridge, and is placed in a blocking state so that frames are not forwarded through that port.

The connectivity through any bridge is thus through its root port to a designated port on another bridge, for connection to devices between the bridge and the root of the spanning tree and from the root to other branches of the spanning tree. For connection to devices between the bridge and leaves of the spanning tree, traffic flows through designated ports on the bridge. When spanning tree information has been completely distributed and is stable, this connectivity will connect all of the LANs in a loop free tree.

According to the spanning tree protocol of the standard, each port on a bridge can assume a blocking state in which frames are not forwarded through the port, or a forwarding state in which frames are forwarded through the port. For a transition from the blocking state to the forwarding state, the protocol requires the port to proceed through transitional states referred to as the listening state and the learning state. In the listening state, the port is preparing to participate in frame relay, however frame relay is temporarily disabled to prevent temporary loops. In the listening state, the port monitors information related to the topology in the network for an interval referred to as the forward delay timer. If no information is received which causes a change in state of the port before expiry of the forward delay timer, then the port transitions to the learning state.

In the learning state, the port continues to prepare for participation in frame relay. The relay is temporarily disabled to prevent loops. In this state, in addition to monitoring bridge protocol data units and other information related to operation of the spanning tree algorithm, the port learns information about end stations that are accessible through the port for use in the forwarding of frames once the port enters the forwarding state. Upon expiration of the forward delay timer, if no better information about the protocol is received, then the port assumes the forwarding state. Thus, the transition from a blocking state to the forwarding state takes at least two times the forward delay timer interval. From the time of detection of a change in topology causing a transition from the blocking to the forwarding state, until the time in which the forwarding state is assumed can be a significant amount of time, as much as 30 seconds in some cases.

In a network of bridges which have a topology managed according to the spanning tree protocol, whenever a bridge detects a change in topology, such as for example when an active link fails, the bridge notifies the root of the active topology with a bridge protocol data unit BPDU packet. The protocol entity at the root of the topology then communicates the change to all of the bridges in the tree. Upon receiving such a notification, the bridges time-out their forwarding databases on all ports, recreate the topology and relearn the MAC addresses for the forwarding databases.

The spanning tree protocol uses a distributed algorithm to select a root bridge and the shortest path to the selected root for each LAN. Tie breakers are used to ensure that there is a unique shortest path and a unique root. The topology is maintained by periodic configuration messages known as Bridge Protocol Data Units BPDUs issued by the root, and distributed to all bridges in the tree. There are two types according to the standard known as Configuration BPDUs and Topology Change BPDUs. The information in a Configuration BPDU is accepted and used by a bridge if it carries better information than already received by the bridge on that port, and propagates the BPDU if it carries better information than already received by the bridge on any of the ports on the bridge. Better information received by a bridge port replaces that previously recorded for the port, and is propagated further if it is the best that the bridge has recorded for any port. Information that is better, is defined by the standard, and includes information from a higher priority root, or from the current root, along a lower cost path, or simply more recent information from the current root at the current path cost. All information has a maximum age so current information will be forgotten eventually, if the root or a bridge or link on the shortest path to the root fails. Periodic message transmissions by the root and potential roots together with information aging ensures that the spanning tree maintains full loop-free connectivity even as bridges and links fail, or are added and removed from the network.

The maximum age of spanning tree information can be managed precisely to accommodate worst case message propagation delays, lost messages, the maximum number of bridges between the root and any LAN in the network, and the estimated adjustments in such bridges to the message age. However, in most cases generous worst case "out of the box" defaults are used. Either way the operation of a protocol has the effect that good news, indicating the availability of a better root or link to the root travels quickly while bad news indicating failure of a link or bridge travels slowly.

Unfortunately bridge or link failure is always bad news. To initiate reconfiguration, a bridge ages out current information while receiving no better message. A bridge close to the root uses the same maximum information age as one at the network edge, so the detection time is set by worst case propagation times or defaults. Even if a bridge were to use local link specific failure detection, other bridges will discard this bad news until they have aged out the original better information.

Accordingly, it is desirable to provide a technique for improving the propagation of information about topology changes in bridges operating according to the spanning tree protocol.

SUMMARY OF THE INVENTION

The present invention provides modifications to the spanning tree algorithm that allows bad news to propagate quickly. Specifically, protocol entities on bridges process inferior information sent by the designated bridge for each LAN. In addition, bridges use per port hello timers to stimulate information propagation, setting each to suit local link characteristics. This enables early link failure detection.

According to the present invention, if protocol entities in a network implement these changes, the maximum age parameter no longer controls reconfiguration delays. Further, forward delays can be substantially reduced since the delay in transitioning a bridge port from forwarding to blocking is set by the worst case information propagation time. Furthermore, the present invention includes an embodiment in which there are no changes to the format of bridge protocol data units (BPDUs) as specified in the IEEE Standard 802.1D, there are no additional protocol data units required, and the algorithm for computing the topology of the network remains unchanged.

In addition, techniques are provided for expiring information and recomputing the spanning tree upon detection of link failure, upon receipt of a message having a message age greater than its accompanying maximum age, or if the port hello time algorithm times out. In addition to the rules for expiring information, new rules for propagating information are provided allowing rapid propagation of changes. Finally, techniques for burning out information in a configuration message are adopted to ensure that information propagating in the network according to these rapid propagation rules burns out to prevent creation of a data loop caused by recomputing topologies in response to the old information.

Accordingly, the present invention can be characterized as a network device in a network comprising a plurality of local area network segments. A network device includes a plurality of ports coupled to LAN segments in the network. Topology management resources manage the plurality of ports according to a spanning tree algorithm to set an active topology for the plurality of ports. In one preferred embodiment, the topology management resources are compliant with IEEE standard 802.1D. Network device also includes resources that are responsive to the active topology to forward frames incoming through ports in the plurality of ports, and to block the forwarding of frames incoming through other ports in the plurality of ports. These resources include a forwarding database storing for the ports in the plurality of ports, respective sets of destination addresses known to be accessible by frames outgoing on the respective ports. The topology management resources further include logic that computes parameters for managing the active topology, including identification of a root of the tree, identification of a port in the plurality of ports for a root port role used for a preferred path to the root, identification of one or more ports in the plurality of ports for designated port roles to be used for the preferred paths between the root and respective LAN segments, and identification of one or more ports in the plurality of ports for alternate port roles. The management resources also include logic that computes states of ports in the plurality of ports in response to the parameters of the active topology. The ports in the plurality of ports are placed in states according to the active topology. In particular, ports in the root port role are placed in a forwarding state. Ports in a designated port role are placed in a forwarding state. Ports in an alternate port role are placed in a blocking state.

According to the present invention logic is provided to update the configuration information in response to acceptance of configuration messages, along with logic to accept configuration messages carrying topology information on a particular port when the configuration message is received from a port on another protocol entity identified as the designated port for the particular port. Thus, according to the spanning tree algorithm, configuration messages are accepted even if they carry inferior topology information than that stored for the particular port. Such inferior topology information according to the spanning tree standard comprises a root identifier identifying a protocol entity with an equal or lower priority than stored as the root, or assuming the preceding is equal having a root path cost equal or higher than that stored for the particular root, or assuming the preceding is equal having a bridge identifier identifying a bridge having a priority equal to or lower than that stored for a designated bridge for the particular root port.

In addition, logic is included on the network device for expiring and recomputing configuration information for the plurality of ports in response to detection of a failure of the link coupled to the particular port, if the particular port is in the root port role. Also information is expired and configuration information recomputed in response to receiving a configuration message on a particular port having a maximum age parameter and a message age parameter, and in which the message age parameter is at least one of equal to, and greater than, the maximum age parameter if the port is in the root port role. Further, logic is provided on the network device to increment the message age parameter by an amount equal to about 1/X of the maximum age parameter. In this case, the parameter X designates a value twice a maximum number plus one of protocol entities traversed by messages in the network. For example, in preferred implementations, the parameter X is about 16 when the maximum number of protocol entities is 7. Alternatively, the parameter X in another embodiment is about 8.

According to another aspect of the invention, the configuration messages include a time interval parameter that indicates a time interval, such as the hello time. The network devices include a timer for ports in the plurality of ports indicating elapsed time from receiving a configuration message on a particular port. Logic is included to expire and recompute the configuration information in response to the timer indicating that the elapsed time reaches a value equal to a function of the time interval parameter carried by the last received configuration message (such as two times the hello time), when the particular port receiving the configuration messages in the root port role.

According to this aspect of the invention, the network devices include resources to propagate a configuration messages including the time interval parameter on a port in the designated port role periodically within the time interval indicated by the time interval parameter, whether or not the device is the root of the network.

According to yet another aspect of the invention, configuration messages are propagated according to rules depending on port role. Thus, resources propagate a configuration messages in response to a change in the configuration information on ports in the plurality of ports which were in the designated port role prior to the change for use by protocol entities between the port in the designated port role and leaves of the tree prior to the change. Also, resources propagate a configuration message in response to a change in the configuration information caused by a previous configuration message received on a port in a root port role, which is root either before or after the change, on ports which are in the designated port role after the change for use by protocol entities between the port in the root port role, and leaves of the tree after the change. Also, configuration messages are propagated in response to the configuration information on all ports in the plurality of ports, if the device identifies itself as the root of the network after the change.

Accordingly, improvements to the spanning tree algorithm are provided which allow for more rapid propagation of topology changes in the network. In particular, the rules improve over the spanning tree algorithm of the ANSI/IEEE Standard 802.1D spanning tree algorithm and protocol by allowing for accepting inferior information, providing additional rules for expiring information, providing additional rules for propagating information from all bridges in the network including the root, and for burning out information using the message age parameters. Overall a more efficient spanning tree algorithm is provided without changing message formats in the preferred embodiment, and without altering the computation techniques for assuring a spanning tree.

Other aspects and advantages of the present invention can be seen upon review of the drawings, the detailed description and the claims which follow.

BRIEF DESCRIPTION OF THE FIGURES

FIGS. 5(A)–5(H) illustrate a network undergoing topology changes, and the processes for propagating such changes according to the present invention for one example event.

FIGS. 7(A) and 7(B) illustrate enhanced spanning tree port roles, states and transitions for point-to-point networks according to one aspect of the present invention.

DETAILED DESCRIPTION

Figure 1:
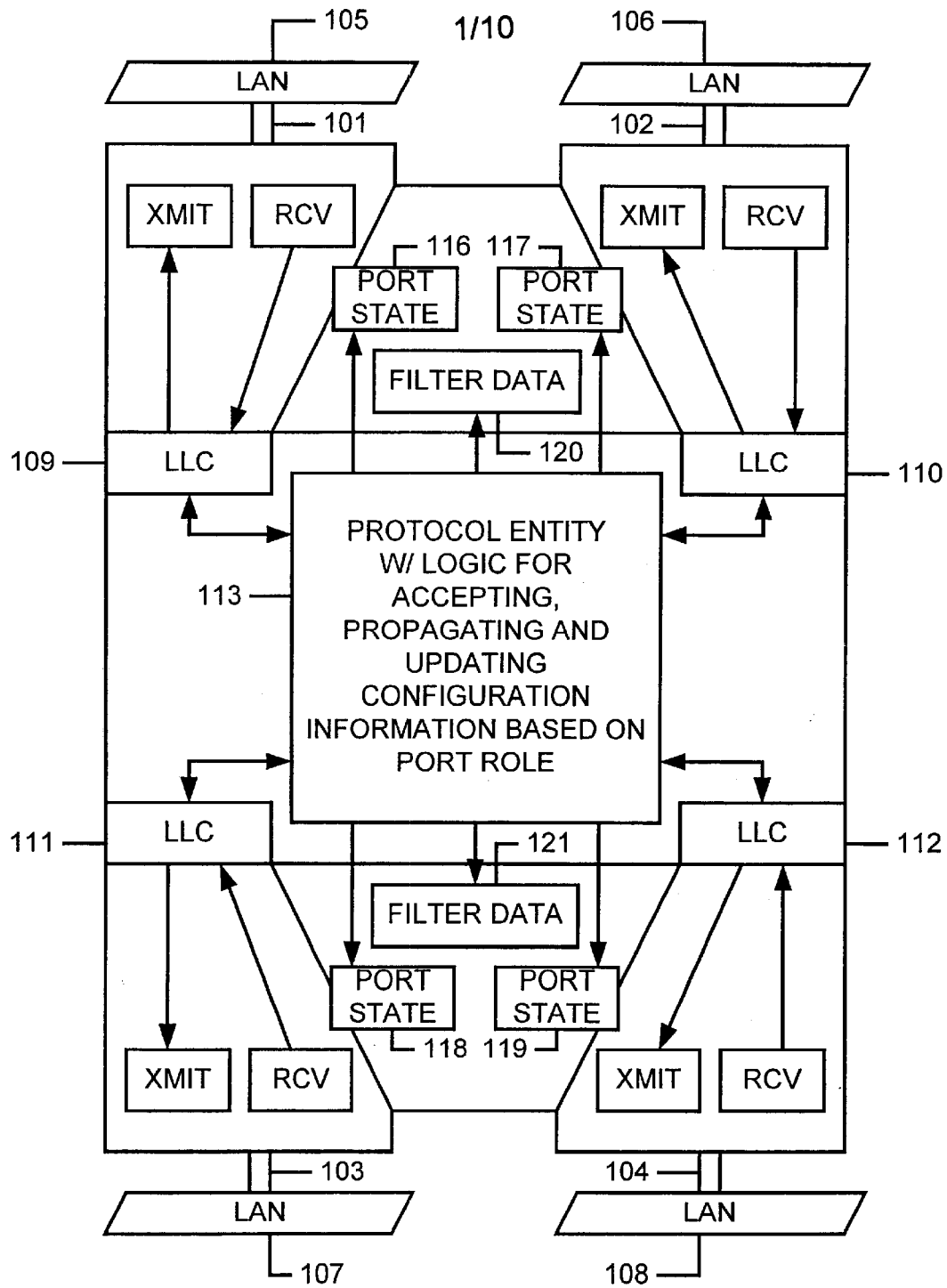
FIG. 1 is a diagram of a bridge according to the present invention with configuration message acceptance, topology computation and expiration, and configuration message propagation management, diagramed in the style of the IEEE 802.1D standard.

A detailed description of the present invention is provided with respect to the figures, in which FIG. 1 provides a block diagram of the bridge functionality in the spanning tree entities, for example in the devices of FIG. 1. FIG. 1 is drawn in the style adapted in the IEEE 802.1D standard (See FIGS. 3–6 in the Standard), and is enhanced to provide four ports.

Thus, the bridge illustrated in FIG. 1 includes ports 101, 102, 103, and 104. Each of the ports 101–104 is coupled to a respective LAN segment 105–108. The ports support, transmit and receive functionality through respective logical link control layer entities 109–112. The LLC entities 109–112 provide for connection to bridge protocol entity 113 according to the present invention. The bridge protocol entity provides for storing parameters that identify port roles according to the present invention, and for managing transition of port state information, and for managing forwarding database entries for the plurality of ports according to the port role information. Thus, the bridge protocol entity maintains filter data in the forwarding database 120, 121, for frames being transmitted amongst the ports, and port state information 116, 117, 118, and 119 for the respective ports.

The bridge protocol entity includes logic for accepting, expiring, updating and propagating configuration information according to the present invention. In particular, if the protocol entity receives a BPDU sent on a LAN by the current designated bridge and from the designated port on such bridge, that BPDU is accepted and processed even if it carries information inferior to the information previously received. Also, because of the message acceptance rules of the present invention, a number of other changes are provided for accepting, updating, expiring and propagating configuration information. For example, the port on which the BPDU is received may have been the root port for the bridge, but may not be after the change. Indeed, after the change the receiving bridge may find itself designated on the port for which the BPDU is received. This in fact may happen to several bridges at once on shared media LANs. The result in this case would be that all bridges assuming the designated role send BPDUs announcing themselves as designated, and causing election of a new designated bridge for the LAN.

In addition, the logic provides for spanning tree information received on a root port, an alternate port or a backup port, (where a backup port is an alternate port for which the designated port for the attached LAN belongs to the same bridge), is expired and the spanning tree is recomputed if the link attached to that port has failed, if the age of received information on that port exceeds the accompanying maximum age, or if more than twice the hello time signaled with the received information has elapsed since it was received, and the receiving bridge is configured to assume that the transmitter is operating at port link hello timer. Also, other functions of the hello time signaled in the received information could be utilized for this expiration rule.

Also, the function of the hello time used for expiring and recomputing spanning tree information can be modified at the receiving protocol entity to allow for any variance in the timeliness of responding to the received BPDUs.

If the proposed standard P802.3ad, for link aggregation is in operation, only failures at the aggregate port level are relevant. The last physical link has to fail before the spanning tree should react.

Furthermore, the protocol entity 113 in the bridge of FIG. 1 includes logic for propagating the information rapidly. If information is to be propagated rapidly, neither an individual bridge nor the network as a whole should be left in an inconsistent quiescent state after reception of inferior information. For individual bridges it is an explicit goal for the preferred embodiment that there are no management visible states, with the possible exception of whether a hello timer is running or not, that appear different than the standard algorithm. For the network as a whole, it is a goal to propagate information upon the change to resolve inconsistencies quickly. According to this goal, retransmissions from the current root of the network cannot be relied upon to do that job, since it may have failed.

For propagating information, a BPDU is sent at least once per link hello time in order to provide a link keep alive functionality without introducing extra protocol.

Following a configuration update for any reason, such as message reception, message expiry, or management change, a BPDU is sent on every port for which the bridge was designated prior to the change, if information on the bridge has been updated. Thus, protocol entities between a port designated prior to the change, and leaves of the tree are notified that the state of its designated port may have changed.

Additionally, if a BPDU is received on the port which continues to be or becomes the root port, BPDUs are transmitted on all ports for which the bridge is designated after updating the configuration. Thus, all protocol entities between the root port in control after the change, and leaves of the tree are notified of the updated root port information. Furthermore, a bridge transmits BPDUs on all ports after first becoming or believing itself to be the root of the network.

These rules ensure rapid propagation of configuration information without adding excessively to the total number of BPDUs transmitted. Differences between these rules and the current rules of the 802.1D standard include that a bridge may send BPDUs in additional circumstances without receiving a message from the root, and that a bridge does not reply immediately to inferior information. The reply procedure of the standard is removed in a preferred system because it leads to excessively chatty behavior when the port on which the reply was to be sent was previously the root port but is no longer. With the introduction of a link hello timer, the process of contradicting bad information arising from message loss no longer relies on the next configuration propagating all the way from the root. Timeliness of information distribution which was the goal of the reply procedure is thus already assured.

These rules for propagation fall short of ensuring complete propagation of information without any further time outs or expiry in the network. Continuing the use of the reply procedure would have achieved that goal, but at the expense of transmitting a considerable number of BPDUs in richly connected topologies all assumed received without loss. The design has to strike a balance between responsiveness, peak processing and buffering demands, and average demands.

Note that generation and acceptance of inferior information does provide much better performance than simply waiting on timer expiry even if that is done on a link by link basis. The latter only propagates through the network at a rate of one hop per expiry time.

In addition, the protocol entity 113 includes logic for burning out information being propagated for topology changes. Accepting and propagating new information from designated bridges allows spanning tree changes to be propagated soon after they are detected. If there are no loops in the physical topology, the old information will obviously be driven out, and out of the edge switches.

Where loops in the physical topology occur, there would appear to be a risk of old information such as memory of a root bridge that has failed some time ago, will circulate around the loops, increasing path costs and message age as it circulates. The 802.1D standard mandates that the age of information in BPDUs never be under estimated, so that information that returns to a bridge on the path from its original source will find better information already there, unless yet worse information has been propagated to that point. Thus, there is a possibility that information will "chase its tail" through the physical loops, when information is propagated according to the present invention.

To guard against this possibility, according to the present invention in one embodiment a minimum increment to the message age is mandated on each transmission by a bridge of at least 1/16th of the maximum age, or alternatively 1/8th of the maximum age. These parameters are determined by a function of the maximum number of protocol entities between a LAN and the root of the bridge, which is specified as 7 according to the present standard. Thus, 1/1+7 provides a minimum increment according to a preferred embodiment of the present invention.

By mandating this minimum increment, circulating information is ensured to be burned out of the network if there is no bridge or bridge port remaining that is the source of that information.

In an alternative approach, the root path cost can be capped in configuration messages. However, this technique of capping root path cost may not work in an environment where gigabit links are accidentally mixed with ten megabit links or other combinations of physical LANs.

Thus, it is important to ensure that old information is guaranteed to age out before forwarding delays are complete. Otherwise dynamically circulating information could create and sustain a data loop for a period of time. However, the removal of old information is now achieved as rapidly as messages can be forwarded in any part of the network with redundant physical conductivity. To ensure that lost messages do not halt burning out of old information, link specific hello timers cause burning out process to continue, if it has stopped, by causing expiration of information in the bridges.

Figure 2:
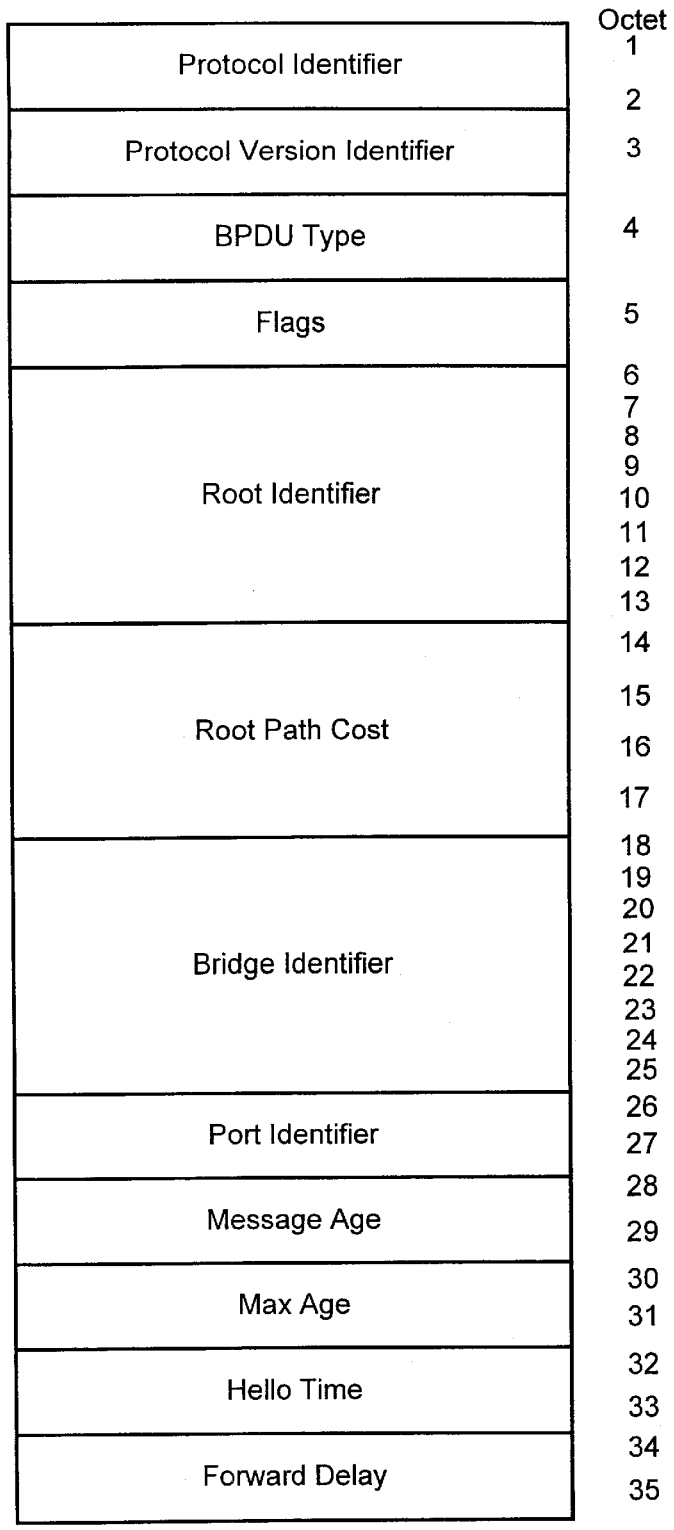
FIG. 2 is a diagram of a configuration BPDU according to the prior art IEEE 802.1D standard.

FIG. 2 illustrates the format of a BPDU according to the prior art spanning tree algorithm. According to the preferred embodiment of the present invention, configuration messages are issued by protocol entities following the format of FIG. 2 without changes. Of course alternative implementations might alter the configuration BPDU if it suits the needs of a particular implementation. However, for backward compatibility and ease of understanding of the improvements, it is preferred to use the same configuration BPDU as specified in the standard.

Thus, the configuration BPDU as shown in FIG. 2 includes a protocol identifier in octets 1 and 2 which basically identifies the spanning tree algorithm. A protocol version number is provided in octet 3. Octet 4 specifies the BPDU type as usually a configuration BPDU or a topology change BPDU. Other BPDU types may also be designated. According to the present invention, the BPDU type is specified as a standard configuration BPDU. Of course, a special BPDU type parameter may be utilized to indicate use of the improvements to the protocol taught by the present invention.

Octet 5 includes a set of flags encoded according to the 802.1D standard. Octets 6–13 provide an identifier of the protocol entity specified as the root of the network by the sending entity. Octets 14–17 specify the root path cost, this parameter indicates the cost of the path to the root bridge from the bridge which transmits the configuration BPDU. This parameter allows bridges which receive the configuration BPDU to compute the lowest cost path to the root for that receiving device.

Octets 18–25 specify a bridge identifier. This unique bridge identifier identifies the bridge which transmits the configuration BPDU. This parameter enables a receiving bridge to decide in the case of a LAN to which two or more bridges are attached, which offer equal cost paths to the root, which of the bridges should be selected as the designated bridge for that LAN.

Octets 26 and 27 specify a port identifier, indicating the port on the transmitting bridge through which the configuration BPDU was transmitted. This identifier uniquely identifies a port on that bridge. The parameter is conveyed to enable a bridge to decide, in the case of a LAN to which two or more ports on the same bridge are attached, which ports are so attached.

Octets 28 and 29 carry a message age. The age of the configuration message, is the time since generation of the configuration BPDU by the root, or other bridge that instigated the generation of this configuration BPDU. This parameter is conveyed to enable a bridge to discard information whose age exceeds the maximum age. According to the present invention, this message age parameter is inserted by bridges issuing the BPDU in response to events other than receipt of another BPDU, or by root bridges.

Octets 30 and 31 provide a max age parameter. This is a time out value to be used by bridges in the bridged network. The value of the maximum age is set by the root, or other originator of the configuration BPDU.

Octets 32 and 33 provide a hello time. This is a time interval between the generation of configuration BPDUs by the source of the configuration BPDUs, or by the root. The final parameter carried by the configuration BPDU is the forward delay parameter in octets 34 and 35. The value of the forward delay is typically set by the root. This parameter is conveyed to ensure that each bridge in the network uses a consistent value for the forward delay timer when transferring the state of a port to the forwarding state. These values are also used as a time out value for aging filtering databases following changes in the active topology.

Accordingly, when the protocol entity of the system illustrated in FIG. 1 issues a BPDU use for propagating a changing configuration, a configuration BPDU of the format illustrated in FIG. 2 and preferably compliant with IEEE 802.1D, is issued.

Figure 3:
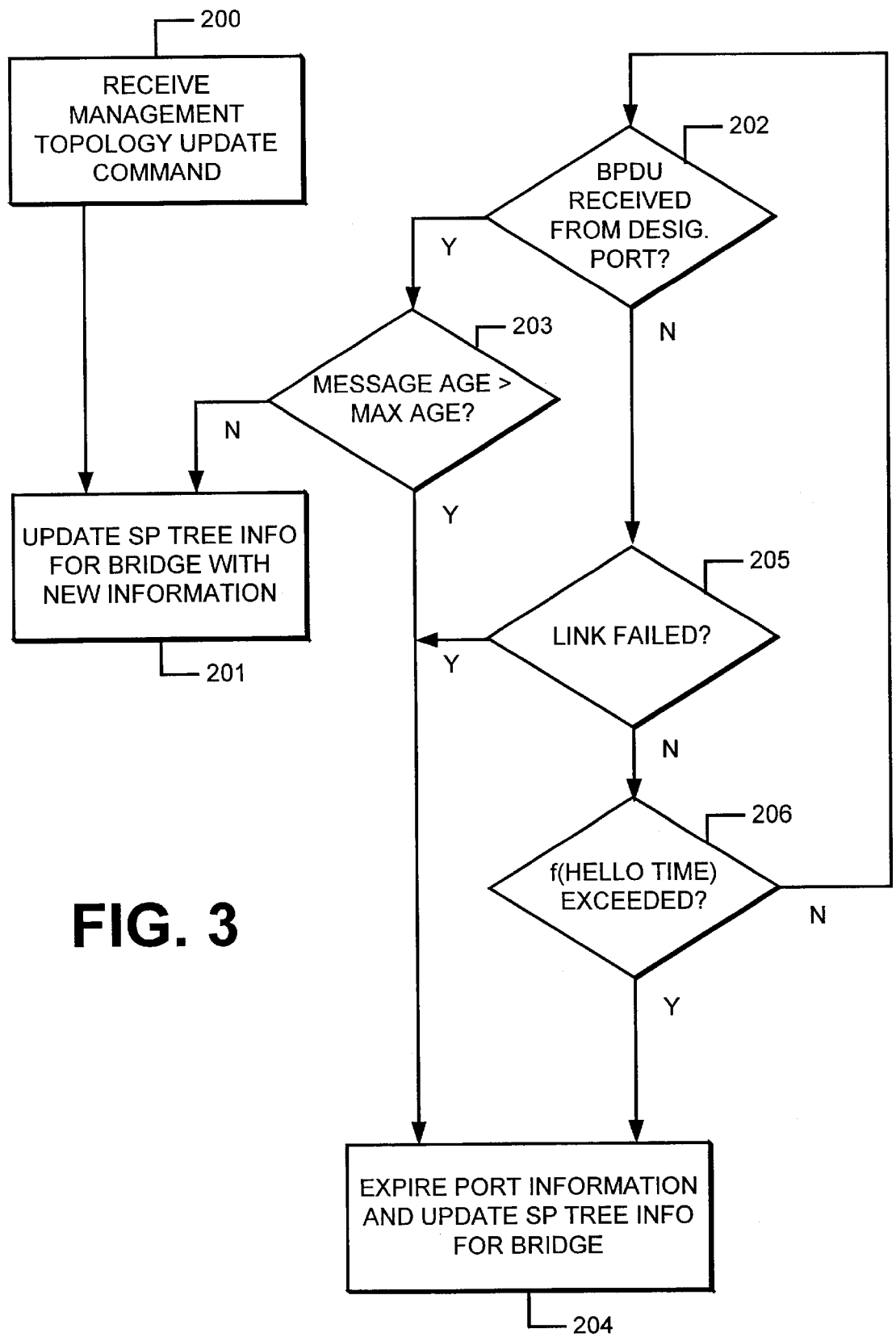
FIG. 3 is a flow chart illustrating the process for initiating an update of the spanning tree topology information for a bridge in response to receiving a BPDU, or information expiration events.
Figure 4:
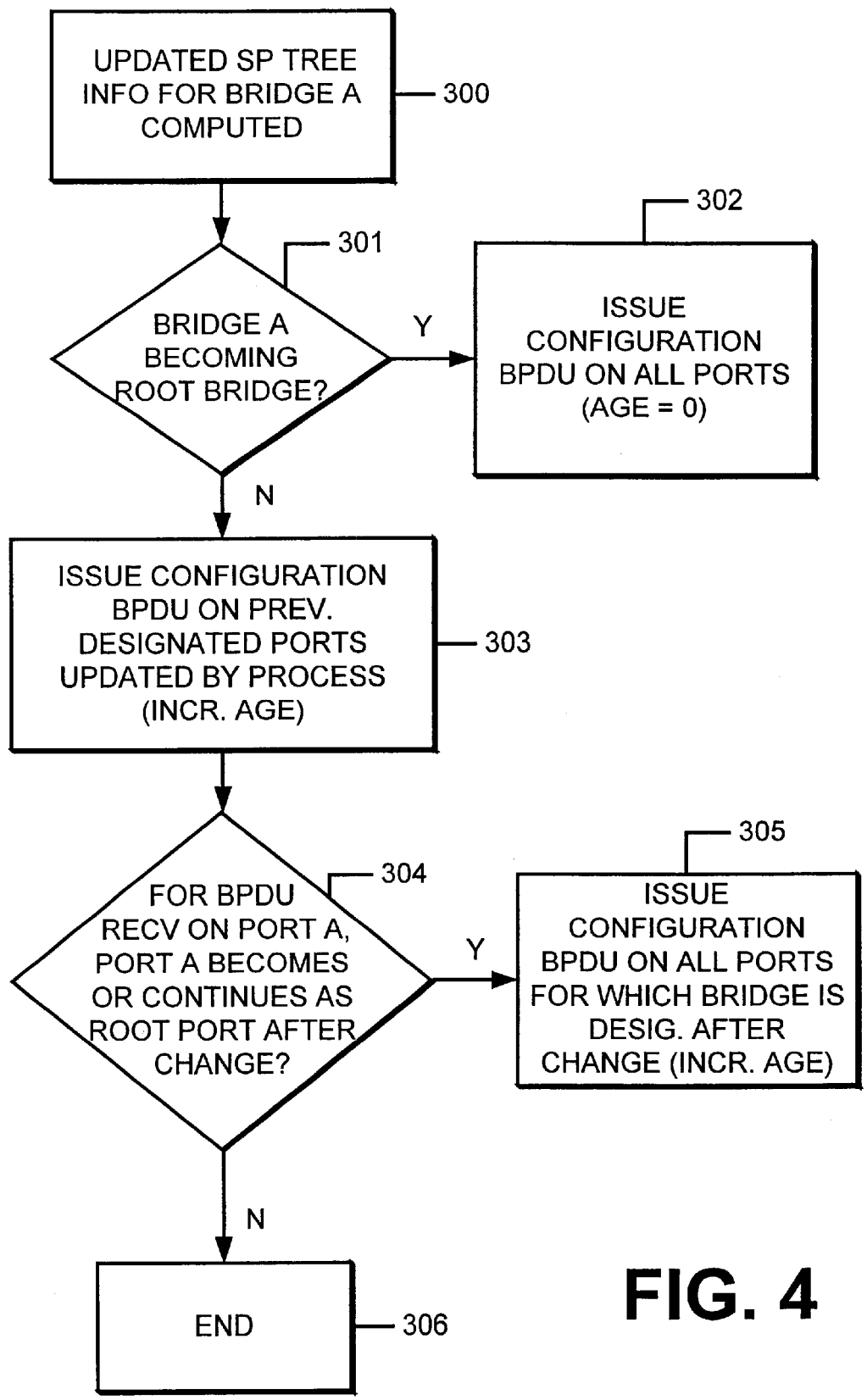
FIG. 4 is a flow chart illustrating the process for managing the propagation of a configuration BPDU according to the present invention.

FIG. 3 illustrates the logic executed by the protocol entity for accepting a BPDU and initiating updating of the configuration, and for expiring information stored for port and updating configuration information for the bridge. FIG. 4 illustrates the logic for determining where to send configuration BPDUs after an update of the spanning tree information.

Thus, according to FIG. 3 the logic monitors for receiving a management signal indicating a topology update (block 200). If such command is received, then the algorithm updates the spanning tree information for the bridge with new information carried in the command from the management entity (block 201). Also the protocol entity monitors for receiving on particular ports a BPDU from a designated port on a designated bridge coupled to the particular port on the bridge (block 202). If a BPDU is received from a designated port, then the algorithm determines whether the message age parameter is greater than the maximum age parameter (block 203). If it is not greater, then the update logic block 201 is initiated. If the message age parameter is greater than the maximum age, then the information on the port which received the BPDU is expired and the spanning tree information is updated for the bridge (block 204).

If at block 202, the BPDU is received on a port from a port other than a designated port, or if no BPDU is received, then the protocol entity monitors for a link failure (block 205). If a link failure is detected, such as loss of a physical layer, keep alive message on a link, then the information for the port to which the failed link is attached is expired and the spanning tree information is updated (block 204). In addition to link failure detection, then the protocol entity monitors for expiration of a time interval which is a function of the hello time carried in the last received BPDU (block 206). For example, if more than twice the hello time is exceeded, then the information for the port is expired and the spanning tree information is updated for the bridge at block 204. If the function of the hello time is not exceeded, then the algorithm loops back to block 202.

Accordingly, FIG. 3 illustrates the logic for expiring and updating spanning tree information, and for updating spanning information in response to receipt of a BPDU on a designated port, independent of whether the BPDU was originated by the root of the network.

FIG. 4 illustrates the logic executed by the protocol entity for determining where to send configuration BPDUs in response to an update of the spanning tree information for the bridge. Thus, upon update of the spanning tree information for bridge A as indicated at block 300, bridge A determines whether it is becoming a root bridge for the network or believes itself to be the root bridge (block 301).

If after the change bridge A believes itself to be the root bridge, then it issues a configuration BPDU on all ports with a message age of zero (block 302). If bridge A is not becoming a root bridge, then a configuration BPDU is issued on all ports of bridge A which were designated ports before the update. If the update occurred as a result of receiving a configuration BPDU from another bridge, then the message age is incremented by a message age increment, for example 1/16th of the maximum age as discussed above (block 303). Next, the protocol entity determines whether for a BPDU received on port A, if port A becomes or continues as the root port after the change (block 304). If it does continue or become a root port, then a configuration BPDU is issued on all ports for which the bridge is designated after the change, and the message age value in the BPDU is incremented (block 305). If the port A at block 304 does not continue to be or become the root, then no additional BPDUs are issued and the algorithm ends (block 306). Thus, if bridge A becomes the root bridge after the change, then all protocol entities between the root and the leaves of the tree are notified by issuing configuration BPDUs on all ports of the root bridge. If a configuration BPDU is received on any port other than the root port, or is received on the root port, and that port ceases to be the root port, then configuration BPDUs are issued to protocol entities between all designated ports prior to the change and leaves of the tree. If a configuration BPDU is received on a root port which continues or becomes the root port after the change, then the configuration BPDU is issued on all ports for which the bridge is designated after the change, notifying protocol entities between the new root, or the same root with updated configuration information, and leaves of the tree.

FIGS. 5(A)–5(H) and FIGS. 6(A)–6(H) illustrate two examples of networks in which configuration changes are propagated according to the present invention. FIGS. 5(A)–5(H) is based on a network including eight protocol entities, R, R', A, B, C, D, W1 and W2. Active spanning tree links are indicated by solid lines 501–507 and redundant links are indicated by dashed lines 508–512. These lines are referred to below by end point bridges, as they are all point-to-point links in the example. The parameters within each protocol entity box include designated root parameter and the root path cost. The ports with the heavy dot (e.g. port 520) indicate the designated port/bridge for the link. The ports indicated by a black line (e.g. port 521) on the box are root ports. Thus, for example bridge R has a designated port coupled across link RA 502 to the root port on bridge A. Likewise, a designated port on bridge B is coupled across a redundant link 509 to bridge C. The port on bridge C coupled to the redundant link is an alternate port in the blocking state.

FIG. 5B illustrates a scenario in which the link (501 in FIG. 5A) between the root R and the bridge A fails. In this case, bridge A detects the failure, expires the information for its previously root port and recomputed the configuration. In response, it will conclude that bridge A is the root of the network and will send BPDUs on all ports as indicated by the arrows on the links AC, AD and AR'. All ports on bridge A will assume the designated port role in this case. In FIG. 5C, the action at bridge C is indicated. In this case, bridge C will conclude that its root port is now port 525 on the link CB, because it will still have information indicating the higher priority root R is accessible through bridge B. Thus it begins to transition the port 525 on the link CB to the forwarding state and assumes that it is the designated port on the link CA. Because the transition at bridge C occurred due to receiving a BPDU from bridge A, the designated ports prior to the change receive the updated information. Thus, BPDUs are issued on the links CW2 and CW1.

Figure 5E:
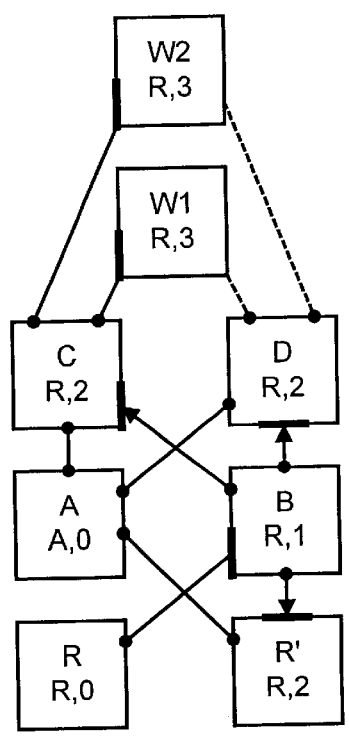
Figure 5F:
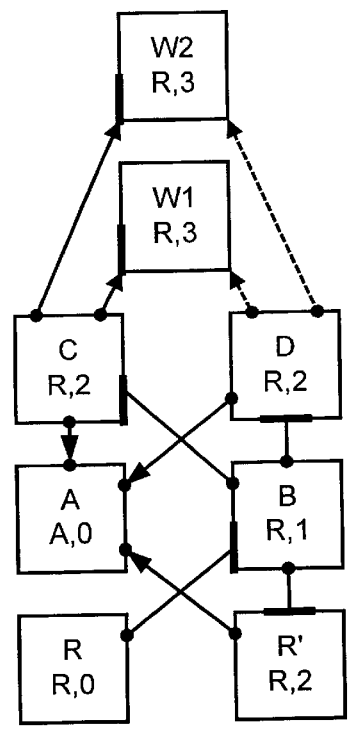

Similar actions occur at bridges D and R' in response to the changes at bridge A. Thus, bridge D changes its root port from the link AD to the link DB and bridge R' changes its root port from the link R'A to the link R'B. In this scenario, the root R will continue to believe itself to be the root and transmits a BPDU on the link RB within the hello time interval. B will update its configuration information if appropriate because it received the message from a designated port on its root port. The message gets forwarded from B to bridges C, D and R' as indicated in FIG. 5E. Next, bridges C, D and R' receive the messages from B, update if appropriate and forward the configuration BPDU to bridge A and to the bridges W1 and W2 as indicated in FIG. 5F.

Figure 5G:
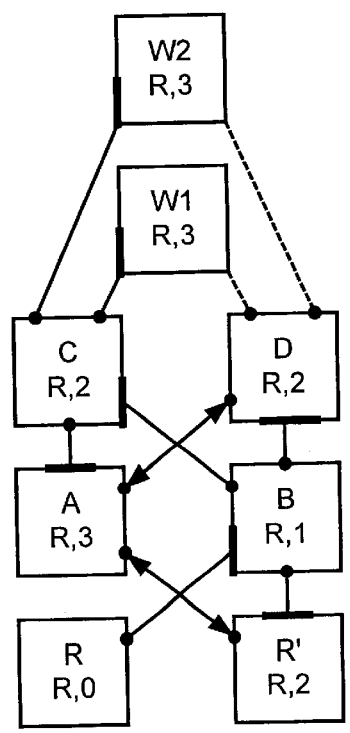

As indicated in FIG. 5G, A receives the message from bridge C first (arbitrarily) and chooses its port on the link AC as the new root. Bridge A then forwards the message on all of its designated ports including the ports linked to bridge D and to bridge R' of the new root. The bridges W1 and W2 receive messages from C and D without changes.

Figure 5H:
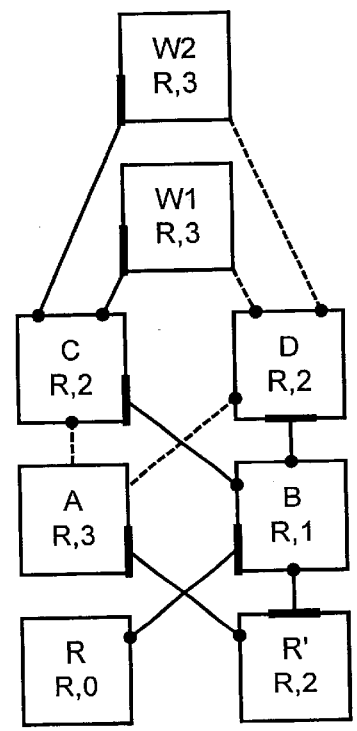

As indicated in FIG. 5H, bridge A will receive messages from R' and D carrying their updated configuration information because they had received a configuration BPDU from a designated port on bridge A, and ports connected to bridge A were designated prior to the change. This information will cause bridge A to move its root port to the port on link AR', and to change the ports on links AC and AD to the blocking state. Bridges D and R' discard messages from A. The final configuration of the network after the change is illustrated in FIG. 5H once the link between C and B is in the forwarding state.

Figure 6A:
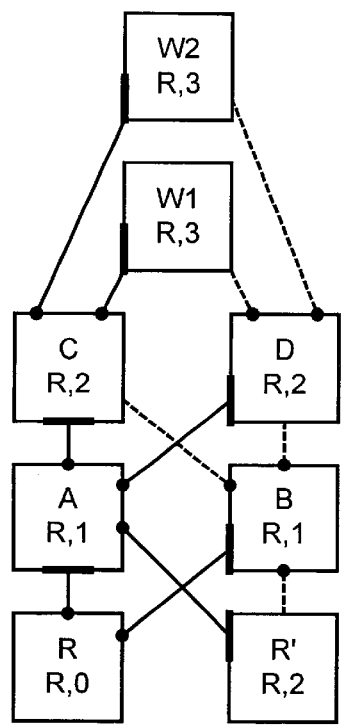
FIGS. 6(A)–6(H) illustrate a network undergoing topology changes, and the processes for propagating such changes according to the present invention for another example change event.
Figure 6B:
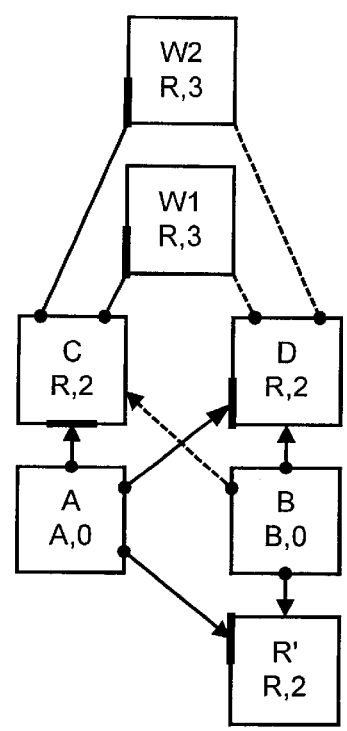

FIGS. 6(A)–6(H) illustrate an example having the same initial configuration shown in FIG. 6A as illustrated in FIG. 5A. In the FIG. 6B, bridge R fails bringing down the links RA and RB. This will cause bridges A and B to remove root port information from their configuration, and each will conclude that it is the new root and will send BPDUs on all of their remaining ports. These BPDUs are illustrated in FIG. 6B as arrows emanating from bridges A and B.

Figure 6C:
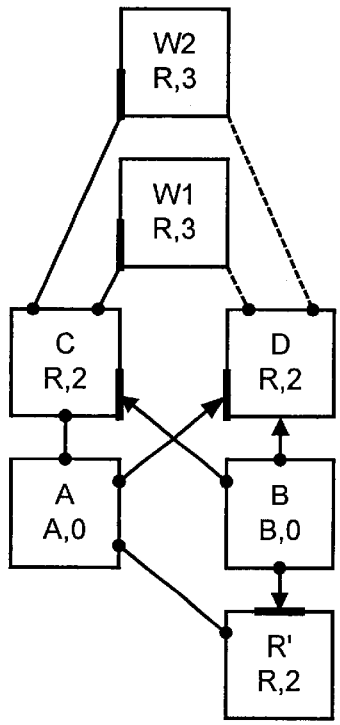
Figure 6D:
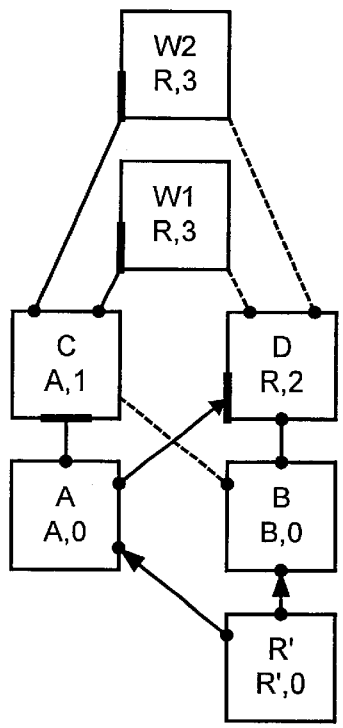

There are many possible next steps depending on the order of processing of the messages in transit. In FIG. 6C, it is assumed that bridge C receives a BPDU from bridge A first and moves its root port to the link CB. Similarly, bridge R' receives the BPDU from bridge A first and moves its root port to the link R'B. As illustrated in FIG. 6D, bridge D responds to a BPDU from B, and becomes the designated bridge on the link DB. Bridge C responds to a BPDU from bridge B and moves its root port to the port on link CA, with A as the root of the network. Bridge R' receives a message from B. As shown in FIG. 6D, R' becomes the root of the network and transmits BPDUs on links R'A and R'B.

Figure 6E:
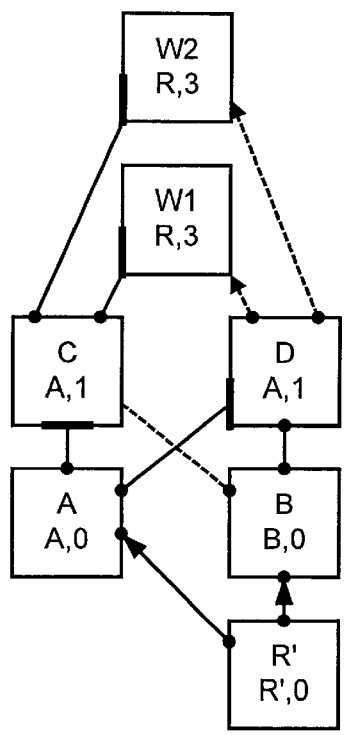
Figure 6F:
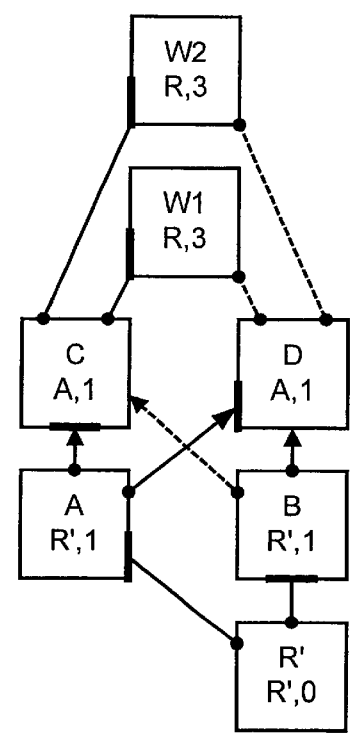

As illustrated in FIG. 6E, bridge D responds to a BPDU from bridge A, recognizes A as the root and transmits BPDUs to the bridges W1 and W2. In FIG. 6F, bridge B responds to a BPDU from bridge R' and recognizes bridge R' as the root. It thus transmits BPDUs to bridges C and D. Likewise, bridge A responds to a BPDU from R', and recognizes R' as the root. Bridge A will then transmit BPDUs to bridges C and D. The bridges W1 and W2 will receive a BPDU from bridge D and become designated on the link W2D and W1D respectively.

Figure 6G:
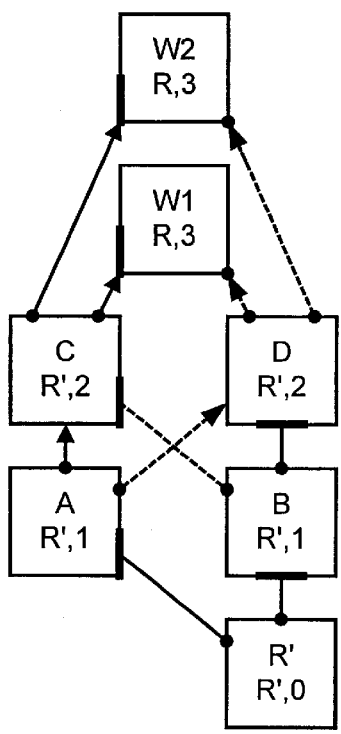
Figure 6H:
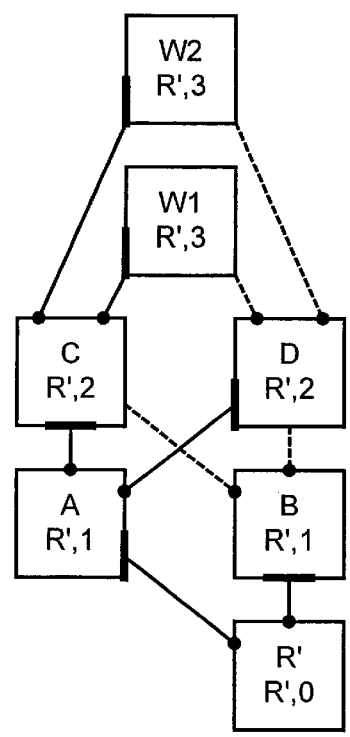

As illustrated in FIG. 6G, assuming that bridge C receives a BPDU from bridge B first, bridge C and bridge D will acknowledge bridge R' as the root and select the ports on links CB and DB as root ports. BPDUs will then be transmitted to bridges W2 and W1. As illustrated in FIG. 6H, the bridges W2 and W1 respond to messages from C and D, and adopt R' as the root. Bridges C and D respond to messages from bridge A and select the port on link CA and the port on link DA as root ports. Messages are forwarded to the bridges W1 and W2. However, the final configuration has been reached and no change occurs as the result.

As mentioned above, in one embodiment, transitions of port states are also managed according to port role. See, co-pending U.S. patent application Ser. No. 09/141,803, entitled HIGH AVAILABILITY SPANNING TREE WITH RAPID RECONFIGURATION, filed on Aug. 28, 1998, by the same inventors, which was owned at the time of invention and is currently owned by the same assignee, and which is hereby incorporated by reference as if fully set forth herein.

FIG. 7A illustrates the enhanced transitions according to the present invention for point-to-point networks, including the transitions that depend on port role and illustrate logic for identifying port roles. It can be seen that for ports in the root port role, there are no listening or learning states. Listening or learning states are not required for a transition from the alternate port role to the root port role. FIG. 7B collapses the table in FIG. 7A to eliminate redundant states in the various roles.

In the tables of FIGS. 7A and 7B, X means event can't happen;—means no action is taken, i.e. no state changes or timer changes. The "footnotes" in the tables follow:

$^a$Start the forward delay timer;

$^b$restart the forward delay timer;

$^d$Stop the forward delay timer;

$^{10}$ This event caused if the new Root Port was not previously Forwarding, i.e. was Blocking, Listening, or Learning. Event covers "enable port" for disabled ports;

$^{11}$This event if the new Root Port was previously Forwarding. Event covers "enable port" for disabled ports.

Accordingly, the present invention provides for faster reconfiguration of switched LAN physical connectivity than is specified in the standard spanning tree algorithm and protocol. This fast reconfiguration is based on allowing inferior spanning tree information to propagate through the network, provided that it is being sent by the bridge that was sending the best information previously, that is the designated bridge for the LAN. Thus, according to the present invention the spanning tree algorithm allows bad news to propagate more quickly through the network. The bridge will process inferior information sent by the designated bridge for each LAN. In addition, information previously received is expired immediately on link failure. In addition the configuration message from a designated bridge is always accepted even if it contains inferior information. Spanning tree recomputation occurs on both of these events and may cause changes in the root and designated port. Changes in information on designated ports is propagated to other bridges effectively.

In addition, bridges use their hello timer to stimulate information propagation, setting it to suit local link characteristics. This enables early link failure detection and removes the need for an additional keep alive mechanism. With these changes the maximum age parameter no longer contributes to the reconfigure delays. Further, forward delay can be substantially reduced, since the delay in transitioning a bridge port from forwarding to blocking is set by the worst case information propagation time. Thus, changes to the details of configuration message reception and propagation according to the present invention significantly improve the performance of the spanning tree algorithm. These changes keep the familiar standard message formats, management parameters and basic algorithm, and significantly improve reconfiguration performance. These improvements are compatible with the improvements in the patent applications referred to and incorporated by reference above, and in preferred system are combined with such improvements.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a network comprising a plurality of local area network LAN segments interconnected by a plurality of protocol entities, a method for managing topology of the plurality of protocol entities comprising:

setting an active topology for a protocol entity in the plurality of protocol entities according to a spanning tree algorithm, based on configuration information stored in the protocol entity;

accepting a configuration message carrying topology information if the configuration message is originated by a neighboring protocol entity designated by the active topology as a route to a different protocol entity identified as a root of the network; and updating the configuration information stored in the protocol entity based on accepted configuration messages.

2. The method of claim 1, wherein said protocol entity includes a plurality of ports, and said configuration information includes an identification of a protocol entity in the network as a root of the network, an identification of a port in the plurality of ports for a root port role to be used for a preferred path to the root, and an identification of one or more ports in the plurality of ports for designated port roles to be used for preferred paths between the root and respective LAN segments in a plurality of LAN segments coupled to the one or more ports.

3. The method of claim 1, wherein said protocol entity includes a plurality of ports, and said configuration information includes an identification of a protocol entity in the network as a root of the network, an identification of a port in the plurality of ports for a root port role to be used for a preferred path to the root, and an identification of one or more ports in the plurality of ports for designated port roles to be used for preferred paths between the root and respective LAN segments in the plurality of LAN segments coupled to the one or more ports; and including computing states for the plurality of ports in a state according to the active topology, including placing the port providing the root port role in a forwarding state, placing the one or more ports providing the designated port roles in a forwarding state, and placing other ports in a blocking state.

4. The method of claim 1, wherein said protocol entity includes a plurality of ports, and said configuration information includes an identification of a protocol entity in the network as a root of the network, an identification of a port in the plurality of ports for a root port role to be used for a preferred path to the root, and an identification of one or more ports in the plurality of ports for designated port roles to be used for preferred paths between the root and respective LAN segments in the plurality of LAN segments coupled to the one or more ports; and including computing states for the plurality of ports in a state according to the active topology in response to the roles indicated by said parameters, including placing the port providing the root port role in a forwarding state, placing the one or more ports providing the designated port roles in a forwarding state, and placing other ports in a blocking state.

5. The method of claim 1, wherein said protocol entity includes a plurality of ports, and including accepting configuration messages on a particular port in the plurality of ports having inferior topology information than that stored for the particular port.

6. The method of claim 1, wherein said protocol entity includes a plurality of ports, and including accepting configuration messages on a particular port in the plurality of ports having a root identifier identifying a protocol entity with an equal or lower priority than stored as the root, or having a root path cost equal or higher than that stored for the particular port, or having a bridge identifier identifying a bridge having a priority equal to or lower than that stored for a designated bridge for the particular port.

7. The method of claim 1, including expiring and recomputing the configuration information for the plurality of ports in response to detection of failure of a link coupled to a particular port in the plurality of ports, if the particular port is in the root port role.

8. The method of claim 1, including expiring and recomputing the configuration information for the plurality of ports in response to receiving a configuration message on a particular port in the plurality of ports, having a maximum age parameter, and a message age parameter, and in which the message age parameter is at least one of equal to or greater than the maximum age parameter.

9. The method of claim 8, including incrementing the message age parameter by an amount greater than or equal to about 1/X of the maximum age parameter, where X designates a value twice a maximum number plus one of protocol entities traversed by messages in the network.

10. The method of claim 8, including incrementing the message age parameter by an amount greater than or equal to about 1/16 of the maximum age parameter.

11. The method of claim 8, including incrementing the message age parameter by an amount greater than or equal to about 1/8 of the maximum age parameter.

12. The method of claim 1, wherein configuration messages include a time interval parameter indicating a time interval, and including timing for ports in the plurality of ports elapsed time from receiving of a configuration message on a particular port in the plurality of ports, and expiring and recomputing the configuration information for the plurality of ports in response to the elapsed time reaching a value equal to a function of the time interval parameter in a received configuration message.

13. The method of claim 12, wherein the function of the time interval parameter is twice the time interval indicated by the time interval parameter.

14. The method of claim 2, wherein configuration messages include a time interval parameter indicating a time interval, and including propagating a configuration message including the time interval parameter on a port in the designated port role periodically within a time interval indicated by the time interval parameter.

15. The method of claim 2, including propagating a configuration message in response to a change in the configuration information on ports in the plurality of ports which were in the designated port role prior to the change for use by protocol entities between the port in the designated port role and leaves of the tree prior to the change.

16. The method of claim 2, including propagating a configuration message in response to a change in the configuration information caused by a configuration message received on a port in the root port role either before or after the change, on ports in the plurality of ports which are in the designated port role after the change.

17. The method of claim 2, including propagating a configuration message in response to a change in the configuration information on all ports in the plurality of ports, if the device identifies itself as the root of the network after the change.

18. The method of claim 1, wherein the configuration messages have a format specified according to a standard spanning tree algorithm for media access control bridges.

\* \* \* \* \*

UNITED STATES PATENT AND TRADEMARK OFFICE
CERTIFICATE OF CORRECTION

PATENT NO. : 6,680,917 B1
DATED : January 20, 2004
INVENTOR(S) : Michael J. Seaman It is certified that error appears in the above-identified patent and that said Letters Patent is hereby corrected as shown below:

Column 15,
Line 5, delete "said parameters" and insert -- said configuration information --.

Signed and Sealed this

Fourth Day of January, 2005

JON W. DUDAS
*Director of the United States Patent and Trademark Office*